United States Patent
Grunow et al.

(10) Patent No.: US 10,319,539 B2
(45) Date of Patent: Jun. 11, 2019

(54) SYSTEM AND METHOD TO DISABLE EXPOSED ELECTRONICS IN A RUGGEDIZED ELECTRONIC DEVICE

(71) Applicant: DELL PRODUCTS, LP, Round Rock, TX (US)

(72) Inventors: David W. Grunow, Round Rock, TX (US); Mark D. Menendez, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 71 days.

(21) Appl. No.: 15/067,959

(22) Filed: Mar. 11, 2016

(65) Prior Publication Data

US 2017/0265316 A1 Sep. 14, 2017

(51) Int. Cl.
*H05K 5/02* (2006.01)
*H01H 9/04* (2006.01)
*G06F 21/00* (2013.01)
*G06F 21/86* (2013.01)

(52) U.S. Cl.
CPC .............. *H01H 9/042* (2013.01); *G06F 21/00* (2013.01); *G06F 21/86* (2013.01)

(58) Field of Classification Search
CPC ..... H05K 5/0217; H05K 7/1427; H01H 9/042
USPC .... 361/752, 832, 705, 93.1, 679.55, 679.01, 361/679.41; 455/556.1, 557, 575.8, 415, 455/343.1
See application file for complete search history.

(56) References Cited

U.S. PATENT DOCUMENTS

| | | | |
|---|---|---|---|
| 7,443,702 B2* | 10/2008 | Yang | H02M 1/36 323/274 |
| 7,945,295 B2 | 5/2011 | Oglesbee et al. | |
| 9,577,695 B2* | 2/2017 | Huang | H01M 10/46 |
| 2003/0095656 A1 | 5/2003 | Sommer | |
| 2004/0002269 A1* | 1/2004 | Jahn | A62C 3/16 439/894 |
| 2010/0128449 A1 | 5/2010 | Mangaroo | |
| 2013/0193149 A1* | 8/2013 | Balourdet | A45F 5/00 220/560.01 |
| 2014/0054025 A1* | 2/2014 | DeCarr | G05D 23/00 165/287 |
| 2015/0092310 A1* | 4/2015 | Sack | H02H 3/06 361/71 |
| 2015/0133204 A1* | 5/2015 | Ivanovski | H04B 1/3816 455/575.8 |

* cited by examiner

*Primary Examiner* — Rockshana D Chowdhury
(74) *Attorney, Agent, or Firm* — Larson Newman, LLP

(57) ABSTRACT

A ruggedized electronic device includes a case and an enclosure within the case. The case provides a first level of explosive atmosphere protection to components within the case. The enclosure provides a second level of explosive atmosphere protection to the components within the enclosure. The second level is higher than the first level. The enclosure includes a main board within the enclosure, and a switch. The main board includes a connection from within the enclosure to the case. The switch provides the connection to the case in a first switched mode and isolates the connection from the case in a second switched mode.

18 Claims, 4 Drawing Sheets

SYSTEM AND METHOD TO DISABLE EXPOSED ELECTRONICS IN A RUGGEDIZED ELECTRONIC DEVICE

FIELD OF THE DISCLOSURE

This disclosure generally relates to information handling systems, and more particularly relates to disabling exposed electronics in a ruggedized electronic device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. The use of the same reference symbols in different drawings indicates similar or identical items. Embodiments incorporating teachings of the present disclosure are shown and described with respect to the drawings presented herein, in which.

SUMMARY

A ruggedized electronic device may include a case and an enclosure within the case. The case may provide a first level of explosive atmosphere protection to components within the case. The enclosure may provide a second level of explosive atmosphere protection to the components within the enclosure. The second level can be higher than the first level. The enclosure may include a main board within the enclosure and a switch. The main board may include a connection from within the enclosure to the case. The switch may provide the connection to the case in a first switched mode and isolate the connection from the case in a second switched mode.

DETAILED DESCRIPTION OF DRAWINGS

The following description in combination with the Figures is provided to assist in understanding the teachings disclosed herein, and will focus on specific implementations and embodiments of the teachings. This focus is provided to assist in describing the teachings, and should not be interpreted as limiting the scope or applicability of the teachings. Moreover, other teachings can be used along with the teachings of this disclosure, and the teachings of this disclosure can be used along with other disclosures.

Figure 1:
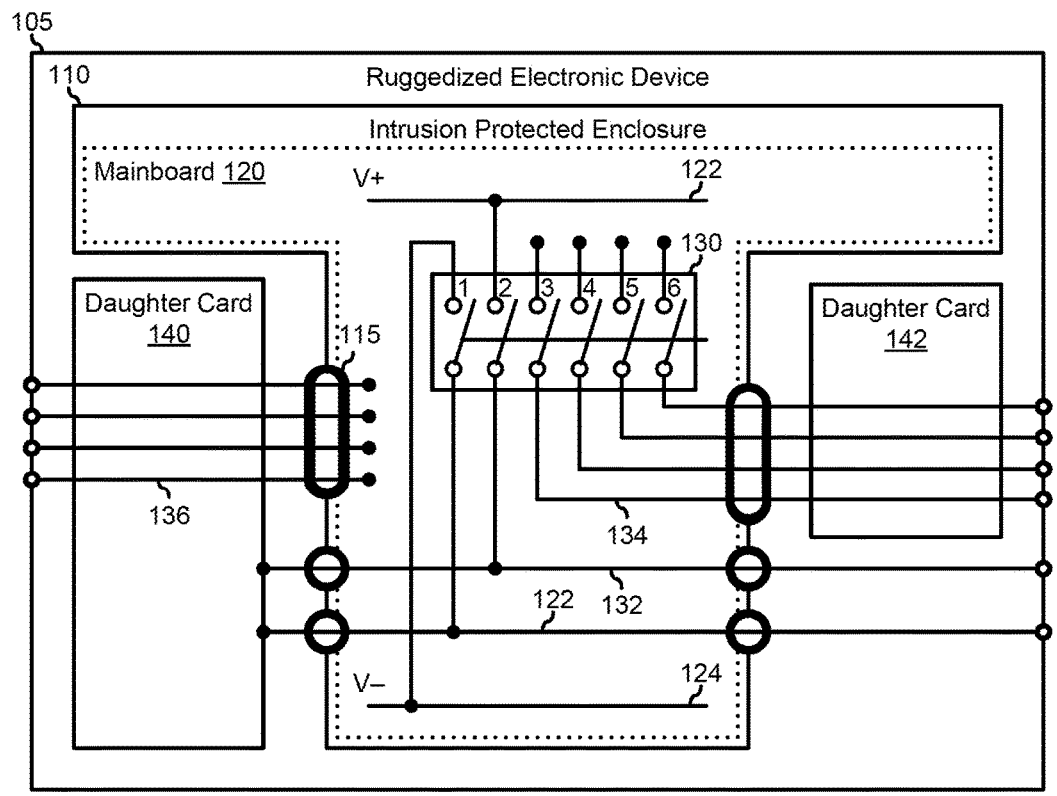
FIG. 1 is a block diagram of a ruggedized electronic device according to an embodiment of the present disclosure.

FIG. 1 shows a ruggedized electronic device 100 that is designed to operate reliably in harsh usage environments and conditions, such as strong vibration, high impact, extreme temperature, wet or dusty conditions, corrosive or explosive environments, or the like. Ruggedized electronic device 100 can be used in various commercial end-user fields, such as public safety, field sales and service, manufacturing, retail, healthcare, transportation/distribution, military, agricultural, and the like. Ruggedized electronic device 100 can be used in various non-commercial end-user fields, such as hiking, trekking, hunting, diving, geocaching, or other fields. An example of ruggedized electronic device 100 includes a ruggedized laptop, a ruggedized tablet PC, a ruggedized smart phone, a ruggedized camera, a ruggedized wearable electronic device, or the like.

Ruggedized electronic device 100 is typically designed to permit the electronic device to absorb impacts and shocks, to have a scuff and scratch resistant surface, and to prevent various intrusive elements from entering the ruggedized case. In a particular embodiment, ruggedized electronic device 100 is designed to meet a particular military, government, or industry standard for impact and shock tolerance, for scuff and scratch resistance, and for ingress protection. For example ruggedized electronic device 100 can meet one or more military standards and specifications, such as the MIL-STD-810G standard (Environmental Engineering Considerations and Laboratory Tests), the Defense Standard 00-35 (UK) standard (Environmental Test Methods for Defense Material), the AECTP-100 (NATO) standard (Allied Environmental Conditions and Test Publication 100) standard, the MIL-S-901 specification (Shock Testing Requirements for Naval Ships), or the like. Likewise, ruggedized electronic device 100 can meet one or more government or industry standards and specifications, such as the National Electrical Manufacturers (NEMA) NEMA-250 (Enclosures for Electrical Equipment) standard, the International Electrotechnical Commission (IEC) standard 60529 for Ingress Protection Marking (IP codes), the European standard EN-62262 (defining IK codes for protection against external impacts), the ATEX 95 directive for equipment intended for use in explosive atmospheres, or the like. Note that in some aspects, one or more of the standards may include complimentary provisions, such that ruggedized electronic device 100 may be in compliance with one or more of the standards. In other aspects, one or more of the standards may cover the same or similar functionality, but one standard may include a higher standard than another standard. Here, ruggedized electronic device 100 would be said to be in compliance with only the lower of the standards for which the ruggedized electronic device meets the standard's criteria. In yet other aspect, one or more of the standards may include conflicting provisions from the other standards. Here, where ruggedized electronic device 100 meets a provision of one standard that conflicts with another standard, the ruggedized device may only be considered to be in compliance with that one standard, and not with the other standard.

Ruggedized electronic device 100 is integrated into a ruggedized case 105 that forms the external surfaces of the ruggedized electronic device. Ruggedized case 105 is designed to provide the mechanical strength and ruggedness associated with the various impact and shock tolerance and scuff and scratch resistance standards, as needed or desired. Note that while other components of ruggedized electronic device 100 can also contribute to the overall ruggedness of the ruggedized electronic device, ruggedized case 105 forms a first line of defense in the overall protection for the ruggedized electronic device. Ruggedized case 105 encloses an intrusion protected enclosure 110, and daughter cards 140 and 142. Intrusion protected enclosure 110 encloses a main board 120 that, along with daughter cards 130 and 132, provide the electronic functions and features of ruggedized electronic device 100. For example, where ruggedized electronic device 100 represents a tablet device, main board 120 can represent one or more circuit boards that include processors, input/output devices such as a touch screen device, power supply and battery circuits, batteries, memory, and the like, and needed or desired, and daughter cards 140 and 142 can represent one or more circuit boards that include add-on memory, wireless communication devices, and the like, as needed or desired. Main board 120 includes power rails 122 and 124, and an ATEX switch 130, and the main board provides switched power rails 132, switched signal lines 134, and unswitched signal lines 136 to daughter cards 140 and 142, and to connectors to the exterior of ruggedized case 105. Intrusion protected enclosure 110 operates to pass switched power rails 132, switched signal lines 134, and unswitched signal lines 136 to daughter cards 140 and 142, and to connectors to the exterior of ruggedized case 105 via one or more grommets 115 that permit the associated wires or signal traces to pass from with the intrusion protected environment to the exterior of the intrusion protected environment without breaching the integrity of the intrusion protected environment.

Intrusion protected enclosure 110 is designed to provide the intrusion protection environment that protects against the intrusion of the various intrusive elements into the ruggedized electronic device 100. As such, components of ruggedized electronic device 100 that are outside of intrusion protected enclosure 110 do not have the same level of protection against with the intrusion of the various intrusive elements as do the components that are within the intrusion protected enclosure. As such, daughter cards 140 and 142 and portions of switched power rails 132, switched signal lines 134, and unswitched signal lines 136, that are outside of intrusion protected enclosure 110, may not be compliant with a particular intrusion protection standard or level, while the components within the intrusion protected enclosure may be compliant with that intrusion protection standard or level. For example, intrusion protected enclosure 110 may be compliant with an IP54 code, where dust and splashing water are prevented from entering the intrusion protected enclosure, but daughter cards 140 and 142 may not be compliant with the IP54 code. In another example, intrusion protected enclosure 110 may be compliant with an ATEX Zone 1 classification where any ignition sources are isolated from locations where explosive gases or vapors may be likely to be present in normal operation, but daughter cards 140 and 142 may not be compliant with the ATEX Zone 1 classification. Note that intrusion protected enclosure 110 can provide other IP code compliance levels or ATEX Zone classification levels, as needed or desired.

Ruggedized electronic device 100 is configured to provide a selectable level of protection against the intrusion of the various intrusive elements. In particular, ruggedized electronic device 100 provides a first mode, an ATEX "unsafe" mode, and a second mode, an ATEX "safe" mode. In the ATEX unsafe mode, ATEX switch 130 is switched into a position to connect switched power rails 132 and switched signal lines 134 to main board 120, such that the functions of the switched power rails and switched signal lines are provided outside of intrusion protected environment 110. However, in the ATEX safe mode, ATEX switch 130 is switched into a position to disconnect switched power rails 132 and switched signal lines 134 from main board 120, such that the functions of the switched power rails and switched signal lines are not provided outside of intrusion protected environment 110. For example, switched power rails 132 are shown as being connected to daughter card 140, and to contacts on the outside of ruggedized case 105. Here, in the ATEX unsafe mode, ATEX switch 130 is switched to connect switched power rails 132 to respective power rails 122 and 124, such that daughter card 140 receives operating power from the power rails, and ruggedized electronic device 100 can receive power via the contacts on the outside of ruggedized case 105 to, for example, charge a battery of the ruggedized electronic device. Then, in the ATEX safe mode, ATEX switch 130 is switched to disconnect switched power rails 132 from respective power rails 122 and 124, such that daughter card 140 is isolated from the operating power from the power rails, and ruggedized electronic device 100 cannot receive power via the contacts on the outside of ruggedized case 105. In a particular embodiment, only the positive voltage switched power rail 132 is switched via ATEX switch 130 to power rail 122, and the negative voltage switched power rail is connected directly to power rail 124. In this embodiment, it may be deemed a sufficient protection against ignition sources to isolate only the positive voltage when in the ATEX safe mode.

Further, switched signal lines 134 are shown as being connected through daughter card 142 to contacts on the outside of ruggedized case 105. Here, in the ATEX unsafe mode, ATEX switch 130 is switched to connect switched signal lines 134 to main board 120, such that ruggedized electronic device 100 can send and receive various signals via the contacts on the outside of ruggedized case 105. Then, in the ATEX safe mode, ATEX switch 130 is switched to disconnect switched signal lines 134 from main board 120, such that ruggedized electronic device 100 cannot send and receive various signals via the contacts on the outside of ruggedized case 105. Here, for example, switched signal lines 134 may be provided at a voltage level that is high enough to be deemed an ignition hazard in an explosive atmosphere. Note that, while switched signal lines 134 are not shown as being connected to daughter card 142, this is not necessarily so, and the daughter card may receive some or all of its operating power the switched signal lines, as needed or desired. Note further that unswitched signal lines 136 are shown as connecting main board 120 to contacts on the outside of ruggedized case 105, but are not shown as being switched via ATEX switch 130. Here, unswitched signal lines 136 may not be provided at a voltage level that is high enough to be deemed an ignition hazard in an explosive atmosphere, and thus the unswitched signal lines to not need to be switched via the ATEX switch.

Figure 2:
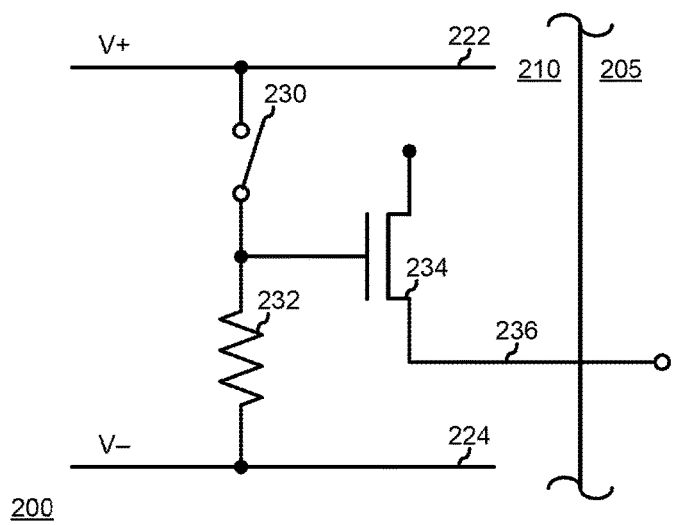
FIG. 2 is a block diagram of a ruggedized electronic device according to another embodiment of the present disclosure.

FIG. 2 illustrates a ruggedized electronic device 200, similar to ruggedized electronic device 100, and including a ruggedized case 205 similar to ruggedized case 105 and an intrusion protected enclosure 210 similar to intrusion protected enclosure 110. Intrusion protected enclosure 110 includes a main board, not illustrated. The main board includes power rails 222 and 224 similar to power rails 122 and 124, an ATEX switch 230, a pull-up resistor 132, a connection switch 234, and a switched signal line 236. Ruggedized electronic device 200 operates similarly to ruggedized electronic device 100, in that ruggedized electronic device 200 is configured to provide an ATEX "unsafe" mode an ATEX "safe" mode. In the ATEX unsafe mode, ATEX switch 230 is switched into a position to connect pull-up resistor 232 to the positive voltage power rail 222, providing a positive voltage at the gate of connection switch 234, thereby switching the connection switch to a conductive state and connecting switched signal line 236 to the main board. Then, in ATEX safe mode, ATEX switch 230 is switched into a position to disconnect pull-up resistor 232 from the positive voltage power rail 122, providing a ground voltage from the negative voltage power rail 224 at the gate of connection switch 234, thereby switching the connection switch to a non-conductive state and disconnecting switched signal line 236 from the main board. Switched signal line 236 can represent a power rail similar to switched power rails 132, or can represent a signal line similar to switched signal lines 134, as needed or desired. Also note that the activation function provided by ATEX switch 230 and pull-up resistor 232 in activating and deactivating connection switch 234 to connect or disconnect switched signal line to the main board, can likewise activate and deactivate one or more additional connection switches to connect one or more switched power rails or switched signal lines to the main board, as needed or desired.

In a particular embodiment, an ATEX switch similar to ATEX switches 130 and 230 represents a mechanical switch component that is compliant with a particular ATEX Zone level classification, such that a mechanical actuator is outside of intrusion protection enclosure 110, such as on an exterior surface of ruggedized case 105, and that has electrical switch contacts that are inside of the intrusion protection enclosure.

Figure 3:
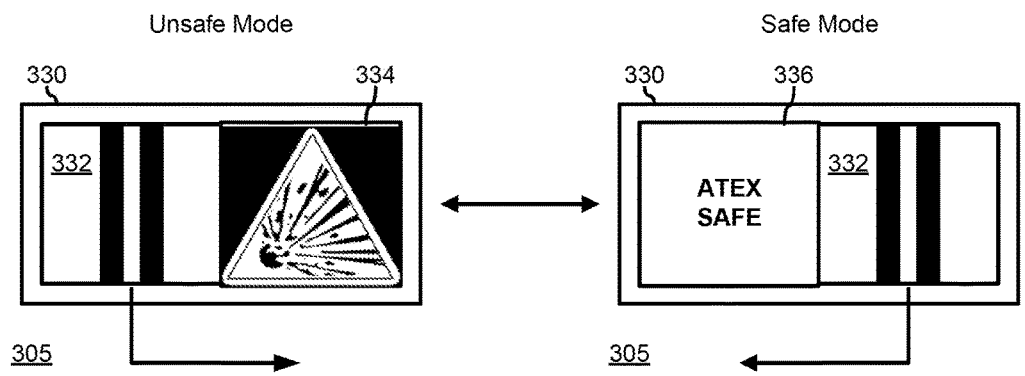
FIG. 3 is an illustration of a mechanical ATEX switch of a ruggedized electronic device according to an embodiment of the present disclosure.

FIG. 3 illustrates an ATEX switch 330, similar to ATEX switches 130 and 230, and that is a mechanical switch component with an actuator 332 on the exterior surface of a ruggedized case 305. ATEX switch 330 is illustrated in the unsafe mode (left-hand illustration) and in the safe mode (right-hand illustration). In the unsafe mode, an actuator 332 is in a first position, illustrated as a left-hand position. Here, the switch contacts of ATEX switch 330 will be understood to be closed. In the safe mode, actuator 332 is in a second position, illustrated as a right-hand position. Here, the switch contacts of ATEX switch 330 will be understood to be opened. ATEX switch 130 includes an unsafe indicator 334 that provides an indication that the ATEX switch, and hence the ruggedized electronic device, is in the unsafe mode, as illustrated in the left-hand illustration, and a safe indicator 336 that provides an indication that the ATEX switch and the ruggedized electronic device are in the safe mode. Here, actuator 232 is seen to physically cover safe indicator 334 and to expose unsafe indicator 336 when ATEX switch 330 is in the left-hand position, and the actuator is seen to physically expose the safe indicator and to cover the unsafe indicator when ATEX switch 330 is in the right-hand position. In a particular embodiment, safe indicator 334 and unsafe indicator 336 are not necessarily physically proximate to or incorporated with ATEX switch 330, but are separate indicators on the ruggedized electronic device. Note that, where ATEX switch 330 is similar to ATEX switch 130, then ATEX switch 330 will be understood to include multiple switch contacts for one or more power rails and switched signal lines. On the other hand, where ATEX switch 330 is similar to ATEX switch 230, then ATEX switch 330 will be understood to include a switch contact to activate a pull-up resistor similar to pull-up resistor 232 and to turn a connection switch similar to connection switch 234.

In another embodiment, an ATEX switch represents a software or firmware driven mechanism for selecting the operating mode, such that there is no mechanical actuator on the outside of an intrusion protection enclosure or on an exterior surface of a ruggedized case. Here, the software or firmware driven mechanism can provide a general purpose I/O of the ruggedized electronic device, the output of which acts as the ATEX switch. In a particular embodiment, the switch contacts of the ATEX switch can be mechanical switch contacts similar to the switch contacts of ATEX switch 130, as provided by a relay type device, and the output of the general purpose I/O can be provided to an input of the relay type device to provide the functions and features of the ATEX switch, as described above. In another embodiment, the ATEX switch can operate similarly to ATEX switch 230, and the output of the general purpose I/O can be provided as an input to one or more connection switches similar to connection switch 234 to provide the functions and features of the ATEX switch.

Figure 4:
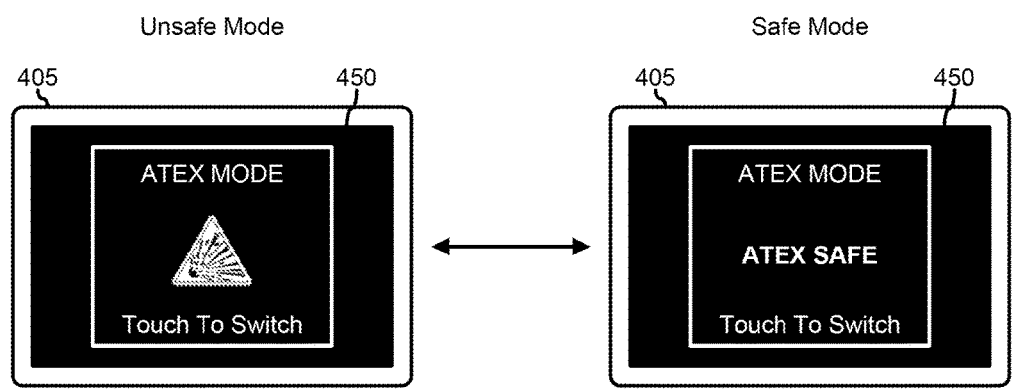
FIG. 4 is an illustration of a ruggedized electronic device according to another embodiment of the present disclosure.

FIG. 4 illustrates a ruggedized electronic device 400 that includes a software or firmware driven mechanism for providing the functions of an ATEX switch. Ruggedized electronic device 400 includes a ruggedized case 405 and a touch-screen device 450 that provides a user of the ruggedized electronic device with an input/output mechanism for using the ruggedized electronic device. Ruggedized electronic device 400 is illustrated in the unsafe mode (left-hand illustration) and in the safe mode (right-hand illustration). In the unsafe mode, a screen icon shows that ruggedized electronic device 400 is in the unsafe mode, and the user is given a prompt to touch the icon to change the mode from the unsafe mode to the safe mode. In the safe mode, the screen icon shows that ruggedized electronic device 400 is in the safe mode, and the user is given a prompt to touch the icon to change the mode from the safe mode to the unsafe mode.

In any embodiment, ATEX switches 130, 230, and 330 may include additional switch contacts, as needed or desired, and that one or more of the additional switch contacts may provide an opposite switch contact operation to the switch contacts as shown herein. For example, a switch contact in one or more of ATEX switches 130, 230, and 330 can be open when the ATEX switch is in the unsafe mode position, and can be closed when the ATEX switch is in the safe mode position. For example, a designer may deem it desirable to positively enable some function or feature of a ruggedized electronic device when the ruggedized electronic device is in the safe mode, such as a lamp, LED, or other indicator that is illuminated when the ruggedized electronic device is in the safe mode, and may opt to utilize a switch contact of the ATEX switch that functions oppositely to the other switch contacts to activate the indicator.

Figure 5:
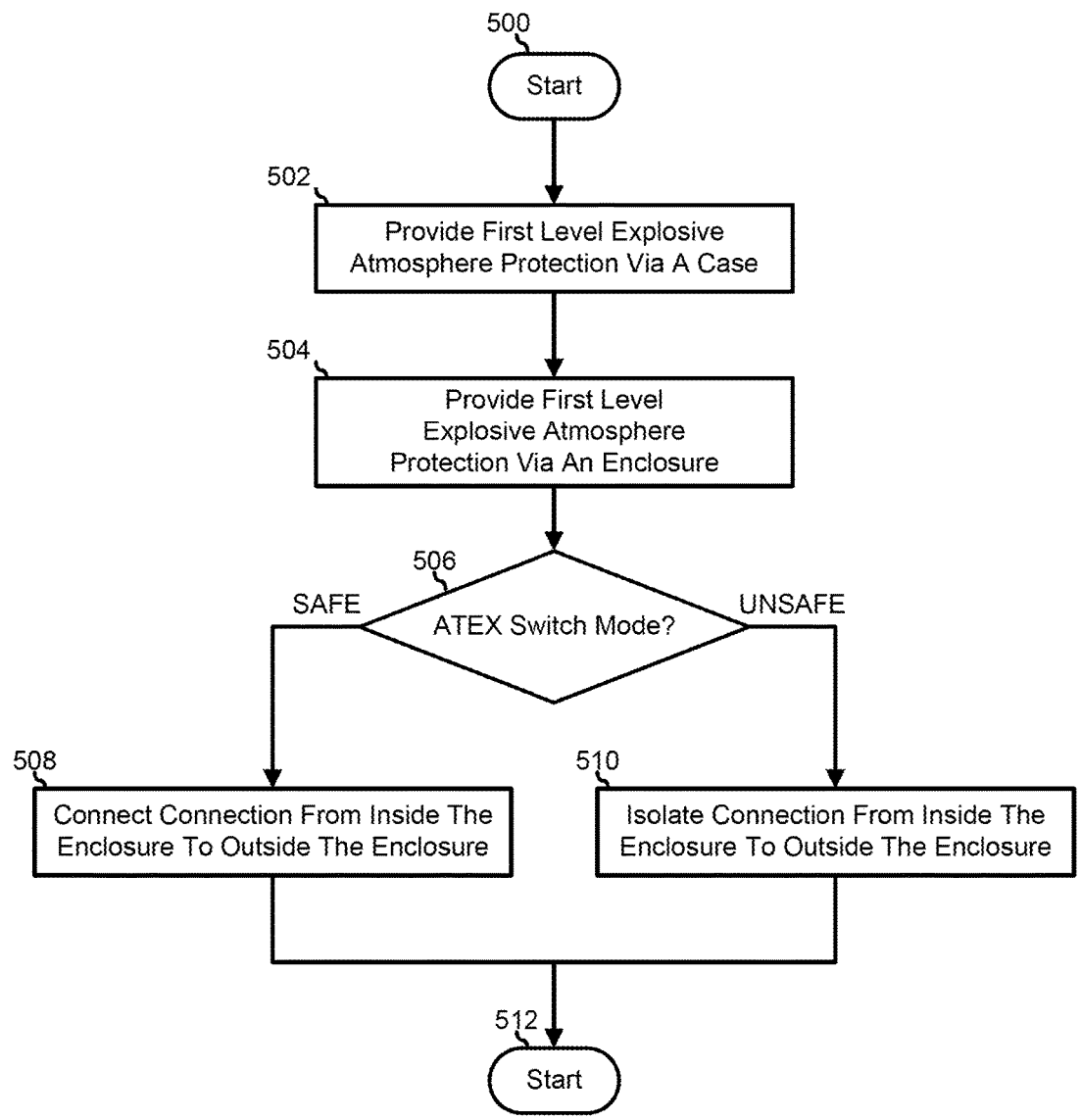
FIG. 5 is a flowchart illustrating a method to disable exposed electronics in a ruggedized electronic device according to an embodiment of the present disclosure.

FIG. 5 illustrates a method to disable exposed electronics in a ruggedized electronic device starting at block 500. A first level of ATEX protection is provided to the ruggedized electronic device by a case in block 502. For example, ruggedized case 105 can provide a lower level of ATEX protection to ruggedized electronic device 100. A second level of ATEX protection is provided to the ruggedized electronic device by an enclosure in block 504. Here, intrusion protected enclosure 110 can provide a higher level of ATEX protection to ruggedized electronic device 100. A decision is made as to whether an ATEX switch of the ruggedized electronic device is in the safe mode or the unsafe mode in decision block 506. If the ATEX switch is in the safe mode position, the "SAFE" branch of decision block 506 is taken and a connection from inside the enclosure is connected to outside the enclosure in block 508, and the method ends in block 512. If the ATEX switch is in the unsafe mode position, the "UNSAFE" branch of decision block 506 is taken and the connection is isolated from the outside of the enclosure in block 510, and the method ends in block 512.

Figure 6:
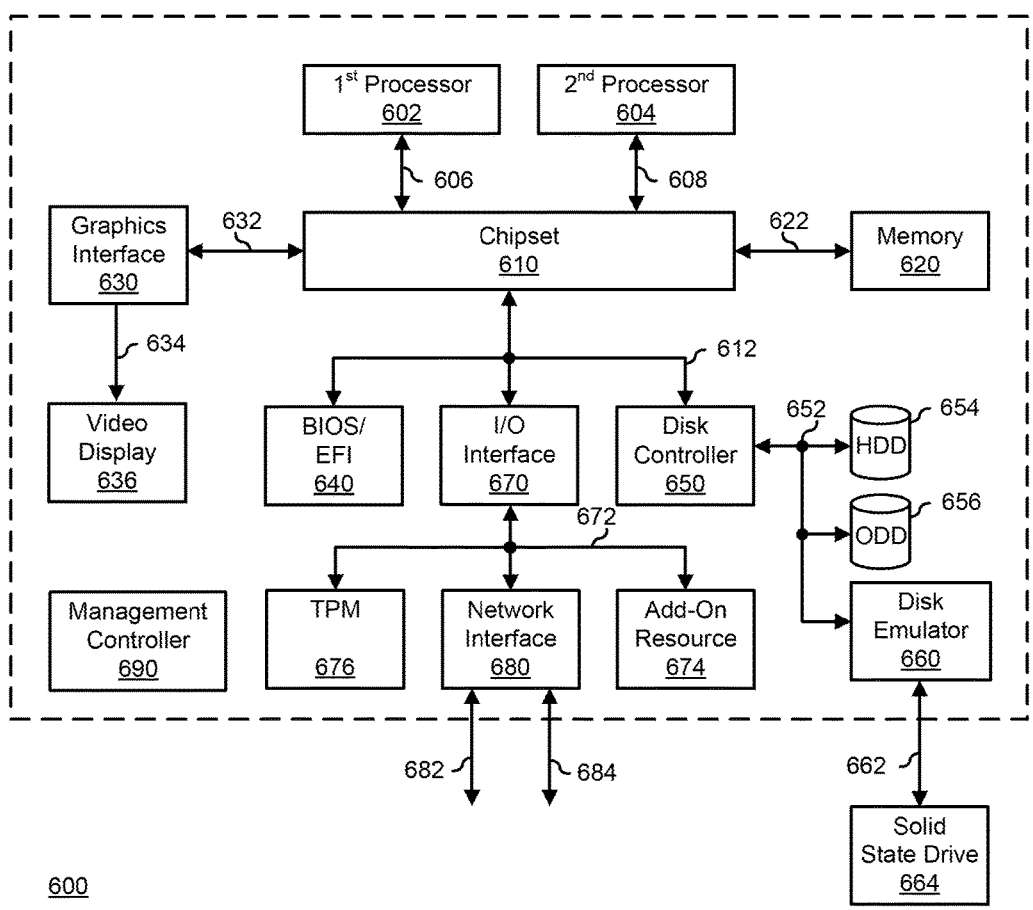
FIG. 6 is a block diagram illustrating a generalized information handling system according to an embodiment of the present disclosure.

FIG. 6 illustrates a generalized embodiment of information handling system 600. For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described above, and operates to perform one or more of the methods described above. Information handling system 600 includes a processors 602 and 604, a chipset 610, a memory 620, a graphics interface 630, a basic input and output system/extensible firmware interface (BIOS/EFI) module 640, a disk controller 650, a disk emulator 660, an input/output (I/O) interface 670, a network interface 680, and a management controller 690. Processor 602 is connected to chipset 610 via processor interface 606, and processor 604 is connected to the chipset via processor interface 608. Memory 620 is connected to chipset 610 via a memory bus 622. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof. Graphics interface 630 is connected to chipset 610 via a graphics interface 632, and provides a video display output 634 to a video display 636.

BIOS/EFI module 640, disk controller 650, and I/O interface 670 are connected to chipset 610 via an I/O channel 612. An example of I/O channel 612 includes a Peripheral Component Interconnect (PCI) interface, a PCI-Extended (PCI-X) interface, a high speed PCI-Express (PCIe) interface, another industry standard or proprietary communication interface, or a combination thereof. Chipset 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, to initialize the resources, and to access the resources.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674, to a trusted platform module (TPM) 676, and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof. TPM 676 can include a dedicated crypto-processor and secure storage, to ensure the integrity of information handling system 600 and to detect and prevent tampering with the operating firmware of the information handling system.

Network interface 680 represents a NIC disposed within information handling system 600, on a main circuit board of the information handling system, integrated onto another component such as chipset 610, in another suitable location, or a combination thereof. Network interface 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management controller 690 provides for out-of-band monitoring, management, and control of the respective components of information handling system 600, such as cooling fan speed control, power supply management, hot-swap and hot-plug management, firmware management and update management for system BIOS or UEFI, Option ROM, device firmware, and the like, or other system management and control functions as needed or desired. As such, management system 690 provides some or all of the functions and features of the management systems described herein.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electronic device, comprising:
    a ruggedized case that forms an external surface of the electronic device, wherein the ruggedized case provides mechanical strength to the electronic device; and
    an enclosure within the ruggedized case;
    wherein;
        the ruggedized case provides a first level of protection against intrusion by an intrusive element to components within the ruggedized case and to components within the enclosure;
        the enclosure provides a second level of protection against intrusion by the intrusive element to the components within the enclosure, the second level of protection providing greater protection against intrusion by the intrusive element than the first level of protection; and the enclosure includes:
            a main board within the enclosure, the main board including a first connection that passes through the enclosure to the ruggedized case, the first connection including a power rail of the electronic device; and
            a switch that provides the first connection to the ruggedized case in a first switched mode and that isolates the first connection from the ruggedized case in a second switched mode; and
        the electronic device further comprises a daughter card within the ruggedized case and outside of the enclosure, wherein the power rail provides power to the daughter card in the first switched mode and the power rail is isolated from the daughter card in the second switched mode.

2. The electronic device of claim 1, wherein the ruggedized case includes a connector on an exterior surface of the ruggedized case, wherein the power rail is connected to the connection in the first switched mode and the power rail is isolated from the connection in the second switched mode.

3. The electronic device of claim 1, wherein the main board further includes a second connection that passes through the enclosure to the ruggedized case.

4. The electronic device of claim 3, wherein the switch provides the second connection to the ruggedized case in the first switched mode and that isolates the second connection from the ruggedized case in the second switched mode.

5. The electronic device of claim 3, wherein the first connection comprises a power rail of the electronic device and the second connection comprises a signal line of the electronic device.

6. The electronic device of claim 1, wherein the switch comprises a mechanical switch including an actuator on an exterior surface of the enclosure, wherein the mechanical switch provides the second level of protection.

7. The electronic device of claim 6, wherein the mechanical switch further includes a switch contact that connects the first connection to the main board in the first switched mode and that isolates the connection from the main board in the second switched mode.

8. The electronic device of claim 6, further comprising:
a connection switch, wherein the mechanical switch further includes a switch contact that activates the connection switch to connect the first connection to the main board in the first switched mode and deactivates the connection switch to isolate the connection from the main board in the second switched mode.

9. The electronic device of claim 1, wherein the switch comprises a firmware function of the electronic device that operates to connect the first connection to the main board in the first switched mode and to isolate the connection from the main board in the second switched mode.

10. The electronic device of claim 1, wherein the intrusive element comprises one of dust, splashing water, an explosive gas, and an explosive vapor.

11. A method, comprising:
providing, by a ruggedized case that forms an external surface of an electronic device, a first level of protection against intrusion by an intrusive element to components within the ruggedized case;
providing, by an enclosure within the ruggedized case, a second level of protection against intrusion by the intrusive element to the components within the enclosure, the second level of protection providing greater protection against intrusion by the intrusive element than the first level of protection;
connecting, via a switch, a first connection from a main board that passes through the enclosure to the ruggedized case when the switch is in a first switched mode, wherein the first connection includes a power rail of the electronic device;
isolating, via the switch, the first connection from the ruggedized case when the switch is in a second switched mode;
providing the power rail to a daughter card within the ruggedized case and outside of the enclosure in the first switched mode; and
isolating the power rail from the daughter card in the second switched mode.

12. The method of claim 11, wherein the first connection comprises a power rail of the electronic device, the method further comprising:
providing the power rail to a connector on an exterior surface of the ruggedized case in the first switched mode; and
isolating the power rail from the connector in the second switched mode.

13. The method of claim 11, further comprising:
connecting, via the switch, a second connection from the main board that passes through the enclosure to the ruggedized case when the switch is in the first switched mode; and
isolating, via the switch, the second connection from the ruggedized case when the switch is in a second switched mode.

14. The method of claim 11, wherein the switch comprises a mechanical switch including an actuator on an exterior surface of the enclosure, the method further comprising:
providing, by the mechanical switch, the second level of protection.

15. The method of claim 14, further comprising:
connecting, via a switch contact of the mechanical switch, the first connection to the main board in the first switched mode; and
isolating, by the switch contact, the connection from the main board in the second switched mode.

16. The method of claim 14, further comprising:
activating, via a switch contact of the mechanical switch, a connection switch to connect the first connection to the main board in the first switched mode; and
deactivating, via the switch contact, the connection switch to isolate the connection from the main board in the second switched mode.

17. The method of claim 11, wherein the switch comprises a firmware function of the electronic device, the method further comprising:
selecting a first firmware mode of the firmware function to connect the first connection to the main board in the first switched mode; and
selecting a second firmware mode of the firmware function to isolate the connection from the main board in the second switched mode.

18. An electronic device, comprising:
a ruggedized case that forms an external surface of the electronic device, wherein the ruggedized case provides mechanical strength to the electronic device; and
an enclosure within the ruggedized case;
wherein:
the ruggedized case provides a first level of protection against intrusion by an intrusive element to components within the ruggedized case and to components within the enclosure;
the enclosure provides a second level of protection against intrusion by the intrusive element to the components within the enclosure, the second level of protection providing greater protection against intrusion by the intrusive element the first level of protection;
the enclosure includes:
a main board within the enclosure, the main board including a first connection within the enclosure to the ruggedized case and a second connection within the enclosure to the ruggedized case, the first connection including a power rail, wherein the first connection includes a power rail of the electronic device;
a switch that provides the first connection that passes through the enclosure to the ruggedized case in a first switched mode and that isolates the first connection from the ruggedized case in a second switched mode; and
the electronic device further comprises a daughter card within the ruggedized case and outside of the enclosure, wherein the power rail provides power to the daughter card in the first switched mode and the power rail is isolated from the daughter card in the second switched mode.

* * * * *